United States Patent [19]

Lee

[11] Patent Number: 5,896,508
[45] Date of Patent: Apr. 20, 1999

[54] HUB-NETWORK ADAPTER DEVICE FOR A FILE SERVER PERSONAL COMPUTER

[75] Inventor: Sherman Lee, Rancho Palos Verdes, Calif.

[73] Assignee: Advanced Micro Devices, Inc., Sunnyvale, Calif.

[21] Appl. No.: 08/393,577

[22] Filed: Feb. 23, 1995

[51] Int. Cl.$^6$ ........................................................ G06F 13/00
[52] U.S. Cl. ........................ 395/200.5; 370/434; 370/501
[58] Field of Search ..................... 395/200.01, 200.15, 395/200.16, 800, 200.02, 200.03, 200.13, 200.5; 370/13.1, 35, 75, 85.2, 85.3, 97, 60, 85.13, 94.1, 94.3, 110.1, 14, 85.1, 85.11, 85.12, 85.15, 85.9, 56, 434, 501, 401–402, 404, 445

[56] References Cited

U.S. PATENT DOCUMENTS

| | | | |
|---|---|---|---|
| 4,825,435 | 4/1989 | Amundsen et al. | 370/501 |
| 5,179,554 | 1/1993 | Lomicka et al. | 370/257 |
| 5,311,593 | 5/1994 | Carmi | 370/400 |
| 5,319,644 | 6/1994 | Liang | 370/452 |
| 5,345,447 | 9/1994 | Noel | 370/362 |
| 5,408,469 | 4/1995 | Opher et al. | 370/397 |
| 5,432,907 | 7/1995 | Picazo, Jr. et al. | 395/200.79 |
| 5,504,738 | 4/1996 | Sambamurtly et al. | 370/296 |
| 5,537,099 | 7/1996 | Liang | 370/241 |
| 5,539,737 | 7/1996 | Lo et al. | 370/401 |
| 5,544,323 | 8/1996 | Heaton et al. | 370/447 |
| 5,550,836 | 8/1996 | Albrecht et al. | 370/461 |
| 5,553,071 | 9/1996 | Aranguren et al. | 370/433 |
| 5,560,038 | 9/1996 | Haddock | 395/200.66 |
| 5,574,726 | 11/1996 | Chan et al. | 370/445 |
| 5,577,023 | 11/1996 | Marum et al. | 370/225 |

OTHER PUBLICATIONS

Advanced Micro Devices, *IEEE 802.3 Repeater: Technical Manual*, 1993, (Full Text).

Advanced Micro Devices, *ISA–HUB™: User's Guide and Reference Manual*, 1993, (Full Text).

Advanced Micro Devices, *Am79C961A PCnet™–ISA II Jumperless, Full Duplex Single–Chip Ethernet Controller for ISA: Preliminary Data Book*, Oct. 1994, (Full Text).

Advanced Micro Devices, *Ethernet/IEEE 802.3 Family: 1994 World Network Data Book/Handbook*, 1994, pp. 1–3 to 1–20, 1–64 to 1–119, 1–142 to 1–151, 1–196, 1–213 to 1–222, 1–231 to 1–243, 1–275 to 1–298, 1–314 to 1–333, 1–343 to 1–429, and 3–1 to 3–13.

Advanced Micro Devices, *PCnet™–ISA+ Ethernet Controller: Hardware Design and Manufacturing Data*, 1994, (Full Text).

(List continued on next page.)

*Primary Examiner*—Moustafa M. Meky
*Attorney, Agent, or Firm*—Skjerven, Morrill, Macpherson, Franklin & Friel, LLP; Edward C. Kwok; Omkar K. Suryadevara

[57] ABSTRACT

A novel hub-network adapter device has a substrate that supports (1) a network interface circuit and (2) a repeater circuit, both of which are directly connected to each other by a number of electrical conductors also supported by the substrate. The network interface circuit includes (1) a network port that is directly connected to a repeater port of the repeater circuit and (2) a number of bus terminals that are coupled to a bus of a file server personal computer. In addition to the directly connected repeater port, the repeater circuit includes a number of repeater ports that are connected to hub's repeater port connectors also mounted on the substrate. The novel direct connection of a repeater port and a network port eliminates the cost of conventional parts, such as a transceiver or an ethernet cable. The novel single substrate eliminates the use of an extra expansion slot that can be necessary in a conventional file server PC to accommodate (1) a hub card and (2) a network interface card, that are distinct and separate from each other. In one embodiment, the hub-network adapter device has the form of a printed circuit board.

25 Claims, 12 Drawing Sheets

OTHER PUBLICATIONS

Advanced Micro Devices, *PCnet™–ISA+ Ethernet Controller: Hardware Reference Manual*, 1994, (Full Text).

Advanced Micro Devices, *PCnet™–ISA II Ethernet Controller: Hardware Reference Manual*, 1994, (Full Text).

Advanced Micro Devices, *PCnet™–PCI: Design and Manufacturing Data*, 1994, (Full text).

Advanced Micro Devices, *PCnet™–PCI: Hardware Reference Manual*, 1994, (Full Text).

Advanced Micro Devices, *PCnet™–ISA II Ethernet Controller: Hardware Design and Manufacturing Data*, 1995, (Full Text).

Advanced Micro Devices, *The PCnet™ Family: Solutions for PC Ethernet Needs*, 1994, (Full Text).

"Newchips Whittle away at networking costs", by Wilson, Ron, Computer Design, vol. 29, No. 23, p. 24(2), Dec. 1990.

"Repeater Interface IC takes on Ethernet Media", by Leonard, Miet, Electronics Design, vol. 39, No. 5, p. 101(2), Mar. 14, 1991.

"MIS heads for the wring closet with 10Base–TLAN", by Greenstein, Irwin, networking Management, vol. 9, No. 3, p. 48(4), Feb. 1991.

"A hub above", by Carrell, Jeffrey L., PC Magazine, vol. 13, No. 2, p. 247(19), Jan. 25, 1994.

"10Base–T chair", by Martin, Louis, EDN, vol. 35, No. 1A, p. 1(2), Jan. 11, 1990.

"LAN Times Lab Tests Concentrators", by LAN Times, Oct. 21, 1991, p. 83; vol. 8, No. 20.

"HP offers 10M–bps Ethernet over twisted–pair phone wire", by Sustar, Lee, PC Weeks, vol. 4, No. 35, PC3(2), Sep. 1, 1987.

"How one band mixed ATM with local network technologies" Data Communications, Jul. 1985, p. 205, vol. 14, No. 8.

"Am79C965 Pcnet™–32 Single–Chip 32–Bit Ethernet Controller", Advanced Micro Devices, 1994, book in its entirety.

"Am79C970 PCnet™–PCI Single–Chip Ethernet Controller for PCI Local Bus", Advanced Mciro Devices, 1994, book in its entirety.

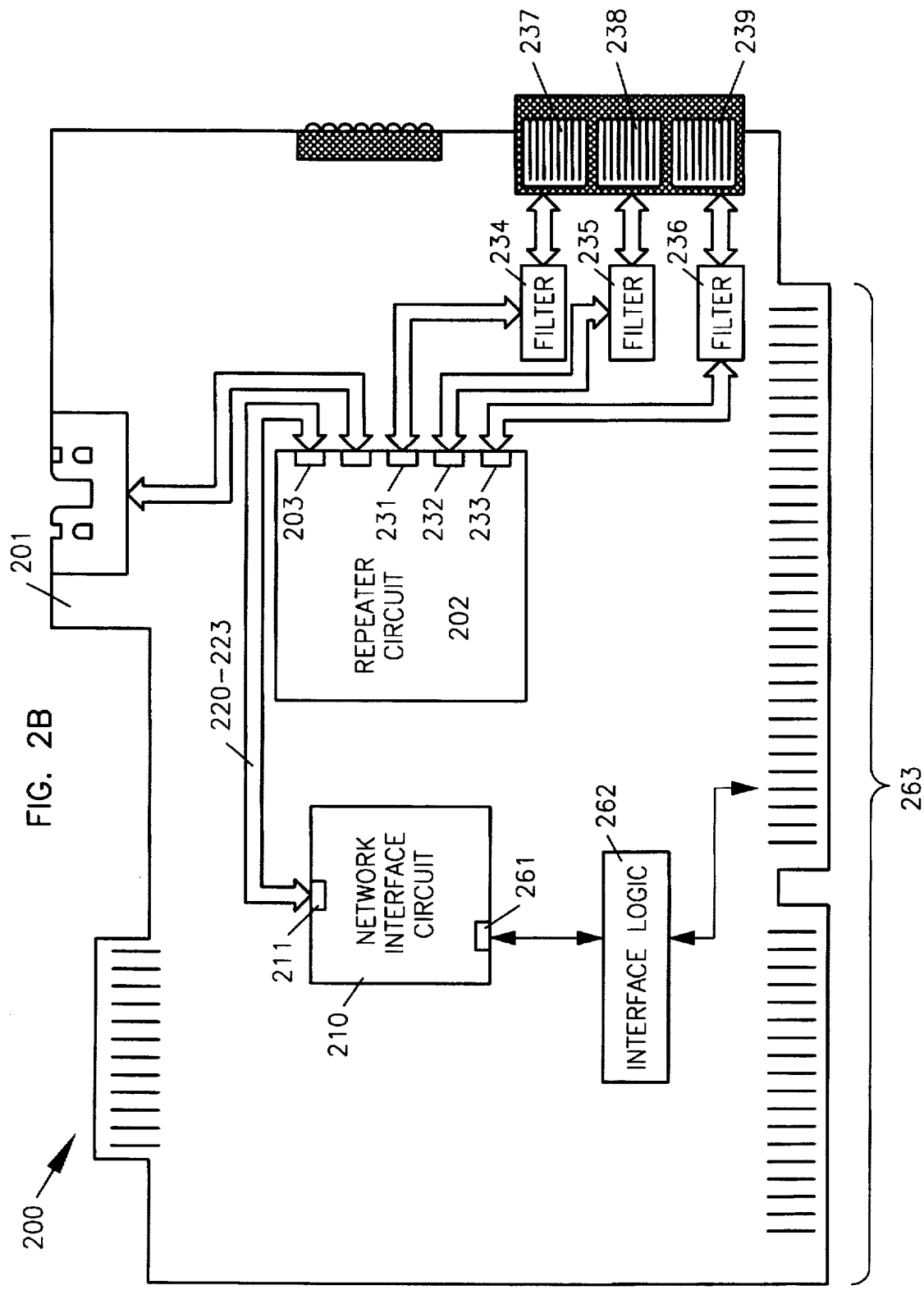

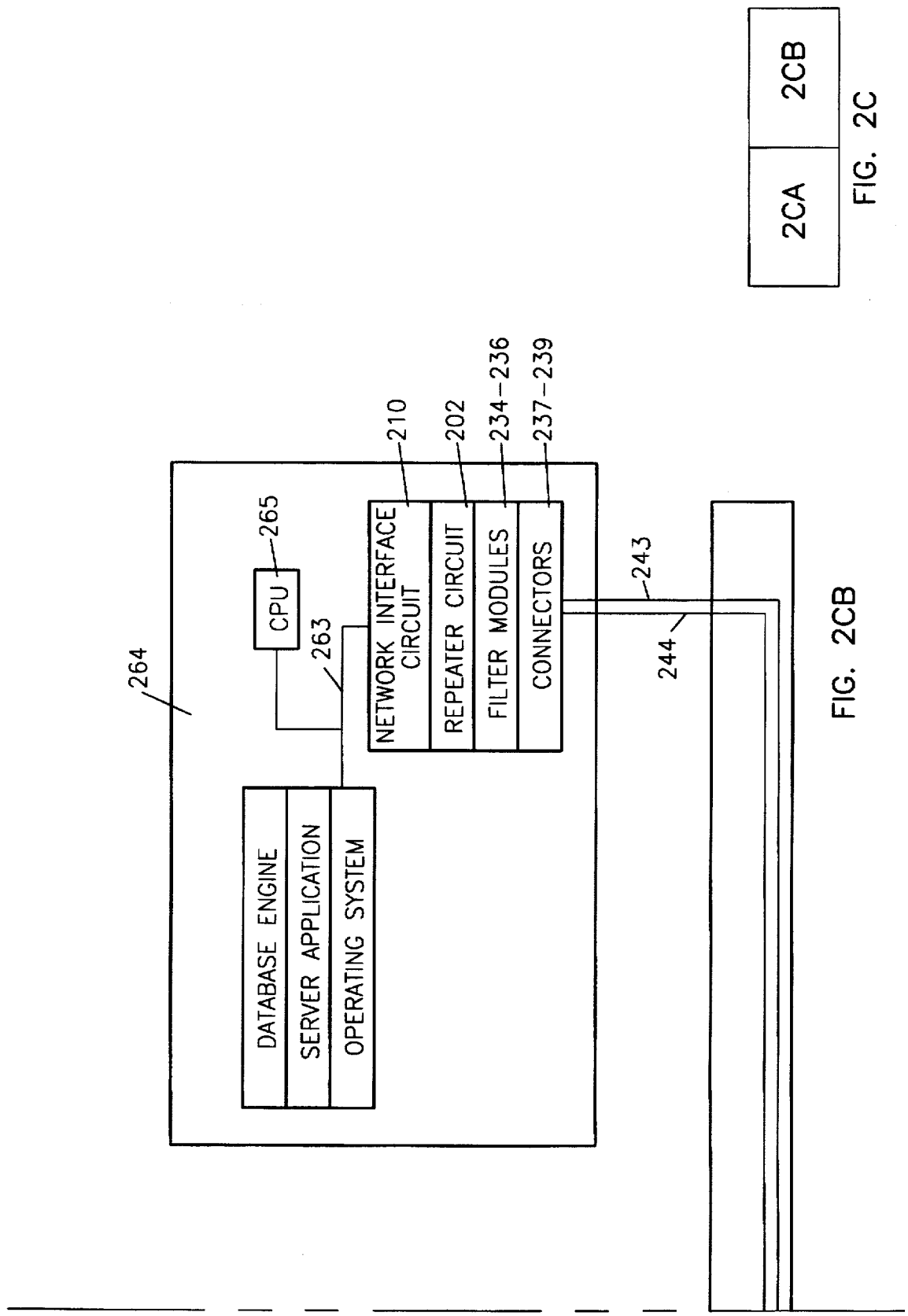

HUB-NETWORK ADAPTER DEVICE FOR A FILE SERVER PERSONAL COMPUTER

FIELD OF THE INVENTION

This invention generally relates to interconnection of personal computers (PCs) on a network, and in particular to a hub-network adapter device that has a single substrate that supports a repeater circuit, a network interface circuit and electrical conductors that directly connect the network interface circuit to the repeater circuit.

BACKGROUND OF THE INVENTION

In a prior art networked client-server computer system 100 (FIG. 1A), client personal computers (PCs) 101–102 communicate with a file server PC 103 to access shared resources, such as a database file 104 or a printer (not shown). The shared resources are commonly shared by client PCs 101–102 over a network, such as ethernet 105 that interconnects all PCs 101–103.

Data transfer over ethernet 105 between PCs 101–103 is implemented by network adapter cards 131–133 mounted in PCs 101–103 respectively. Network adapter cards 131–133 include: (1) network connectors 141–143 that transmit and receive signals on ethernet 105, (2) filter modules 151–153 that filter noise, and (3) network interface circuits 161–163 that perform the functions of proper addressing, reading and storing of data to be exchanged over ethernet 105. Network interface circuits 161–163 implement a carrier-sense-multiple-access collision-detect (CSMA/CD) protocol during exchange of data.

FIG. 1B illustrates one example of a network adapter card 131, that uses as a network interface circuit 161, for example, AM 79C970 illustrated in FIG. 1C, described in "Ethernet/IEEE 802.3 Family-World Network Data Book/Handbook," 1994 and also described in "PCnet™PCI Hardware Reference Manual" both by AMD, One AMD Place, P.O. Box 3453, Sunnyvale, Calif. 94088-3453, that are both incorporated by reference herein in their entirety. In the example of FIG. 1B, network interface circuit 161 includes a 10BASE-T media attachment unit (MAU) port 162 (FIG. 1C) that implements the 10BASE-T functions defined in Sections 13 and 14 of IEEE Std 802.3i-1990—that is a supplement to ISO/IEC 8802-3:1990, Product Number SH16337, available from IEEE Service Center, 445 Hoes Lane, P.O. Box 1331, Piscataway, N.J., USA 08855-1331 and that is incorporated herein by reference in its entirety. Network interface circuit 161 also includes an attachment unit interface (AUI) port 163 (FIG. 1C) that is implemented as a data terminal equipment (DTE) for attachment to an external MAU (not shown), as an alternative to 10BASE-T MAU port 162.

In a 10BASE-T ethernet, each one of connectors 141–143 (FIG. 1A) of respective network adapter cards 131–133 is connected by Unshielded Twisted Pair (UTP) cables 171–173 to a hub card 180. While a hub card is typically part of a stand-alone hub, for smaller networks (e.g. 8 stations) hub card 180 (FIG. 1A) can be mounted inside file server PC 103 to reduce costs by sharing the PC's chassis, power supply and processor.

FIG. 1D illustrates one example of a prior art hub card 180, that includes as a repeater circuit 199, for example, AM 79C981 illustrated in FIG. 1E, described in "Ethernet/IEEE 802.3 Family-World Network Data Book/Handbook" that was referenced above and also described in "ISA-HUB™ User's Manual" that is incorporated by reference herein in its entirety. Repeater circuit 199 has one AUI port and eight 10BASE-T MAU ports. Use of repeater circuit 199 is described in, for example, "IEEE 802.3 Repeater Technical Manual" available from AMD (above) that is also incorporated by reference herein in its entirety. The AUI port of repeater circuit 199 is also implemented as a DTE for attachment to an external MAU (not shown).

Three of the 10BASE-T ports of repeater circuit 199 are coupled through filter modules 191–193 (FIG. 1A) to hub connectors 181–183 that are connected by UTP cables 171–173 to network adapter cards 131–133. Repeater circuit 199 receives packets from any one of attached network adapter cards 131–133 and propagates a received packet to all attached network adapter cards 131–133. During propagation of the received packet, repeater circuit 199 retimes the bits being retransmitted. Repeater circuit 199 also detects collision by monitoring activity on all hub connectors 181–183.

Installation of hub card 180 in file server PC 103 can require an expansion slot that is a scarce and valuable commodity in a file server PC. Therefore it is desirable to support both a repeater circuit and a network interface circuit on a single printed circuit board (PCB).

Network interface circuit 161 and repeater circuit 199 both have AUI ports that can be coupled to each other through a twisted pair ethernet transceiver, e.g. AM 79C98 or AM 79C100 that converts the AUI port signals to 10BASE-T signals, as shown in FIG. 1F, because both AUI ports are implemented as DTEs. Such connections are described in, for example, "IEEE 802.3 Repeater-Technical Manual" referenced above.

However, the use of a twisted pair ethernet transceiver to indirectly couple a network interface circuit and a repeater circuit adds to the cost of the PCB. Moreover, the large number of components results in high power consumption and low reliability that may not be acceptable for some file server applications.

SUMMARY

In accordance with this invention, a novel electronic device, also called "hub-network adapter device," has a single substrate that supports
(1) a network interface circuit having a network port,
(2) a repeater circuit having a repeater port and
(3) a number of electrical conductors that directly connect the network port to the repeater port. In one embodiment the network port and the repeater port are 10BASE-T ports.

The network interface circuit includes, in addition to a network port, a transmit buffer, a receive buffer, a media access control circuit, an encoder-decoder circuit and a number of bus terminals. In one embodiment a central processing unit in a file server personal computer is coupled by a bus to the bus terminals, and uses the bus to transfer to the media access circuit, the data to be transmitted. The media access control circuit formats the received data into a packet and stores the packet to be transmitted in a transmit buffer. The encoder-decoder circuit uses each packet stored in the transmit buffer to drive transmit signals on transmit terminals of the network port. The transmit signals are directly conveyed by electrical conductors in the substrate to receive terminals of a repeater port.

In addition to the repeater port directly connected to the network port, the repeater circuit includes a number of repeater ports that are indirectly coupled to remote network ports, through filters, and hub connectors that are also mounted on the substrate. The indirectly coupled repeater ports drive signals on ethernet cables to network interface circuits of client P.C.s in the same manner as in the prior art.

A similar sequence of events occurs in the reverse order during receipt of data by the file server personal computer from a client personal computer.

The direct connection on a single substrate between a network port and a repeater port as described above, eliminates conventional parts, such as twisted pair ethernet transceiver or a filter, a connector and an ethernet cable. Therefore, the hub-network adapter device has fewer parts, greater reliability and lower cost as compared to prior art devices.

In one embodiment, the hub-network adapter device has the form of a single printed circuit board in which the substrate is printed circuit board core, such as glass epoxy FR4. The network interface circuit is formed in a first integrated circuit mounted on the substrate, the repeater circuit is formed in a second integrated circuit also mounted on the substrate and the electrical conductors are conductive traces formed within the substrate.

In one specific embodiment, a hub-network adapter device is included in a novel file server personal computer that supports access to a number of shared devices by a number of client personal computers. A network adapter card in each client personal computer contains a network port that is coupled through a filter and a connector on the network adapter card, to an ethernet cable that is in turn connected to a connector on the hub-network adapter device in the file server personal computer.

BRIEF DESCRIPTION OF THE DRAWING

FIG. (consisting of FIGS. 1AA and 1AB) illustrates in block diagram a prior art computer system.

FIGS. 2A and 2B illustrate a hub-network adapter card in accordance with this invention.

DETAILED DESCRIPTION

Figure 2A:
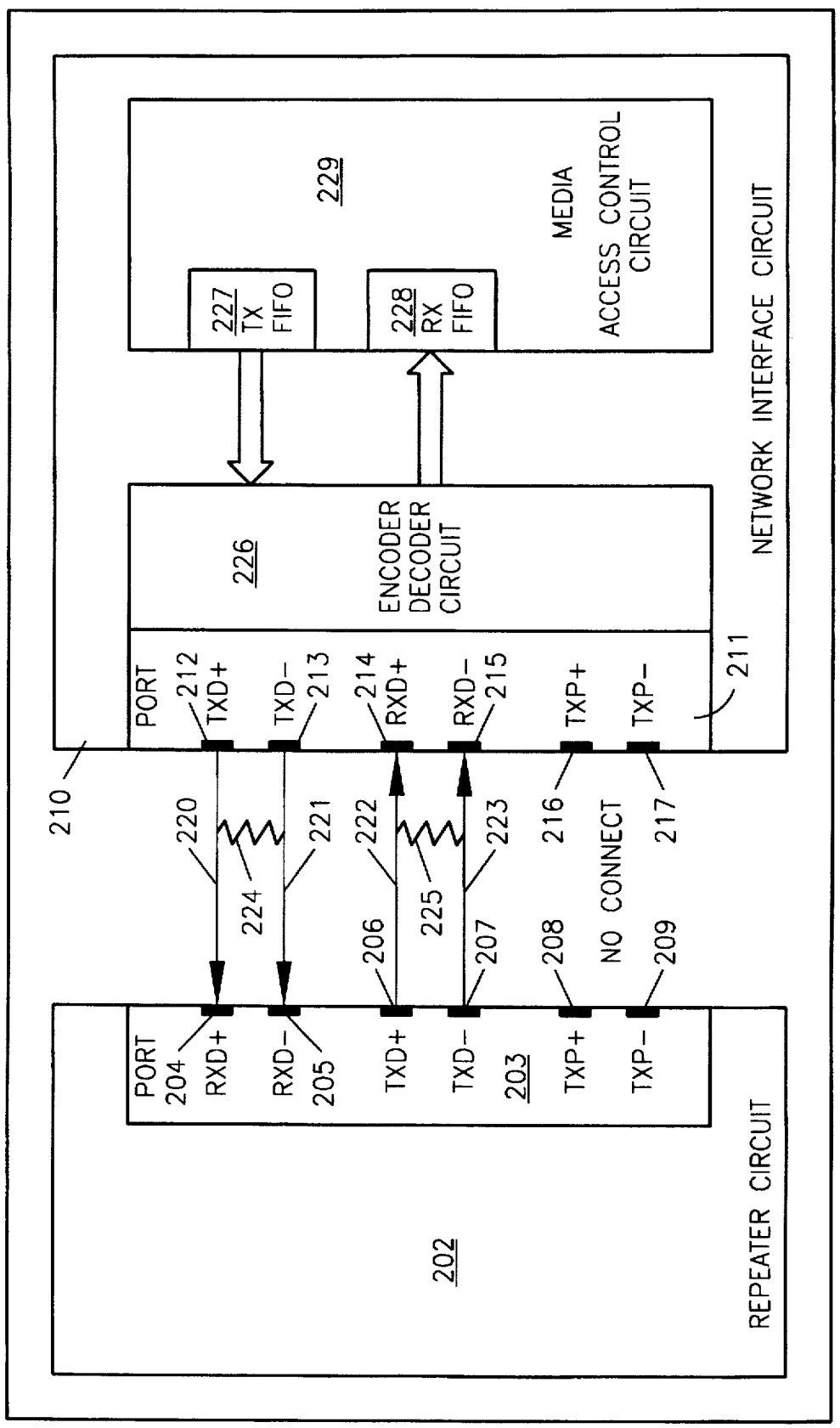

A novel hub-network adapter device 200 (FIG. 2A) includes a substrate 201 that supports a repeater circuit 202 having a repeater port 203. In the embodiment of FIG. 2A, repeater port 203 is a 10BASE-T port that receives Manchester encoded differential signals on positive receive terminal 204 and negative receive terminal 205.

Repeater port 203 transmits Manchester encoded differential signals on positive transmit terminal 206 and negative transmit terminal 207. Finally, repeater port 203 drives predistortion signals on positive predistortion transmit terminal 208 and negative predistortion transmit terminal 209.

In one specific embodiment, repeater circuit 202 is AM 79C981 integrated multiport repeater plus (IMR+) that is available from AMD (above). In the embodiment illustrated in FIG. 2A, substrate 201 is printed circuit board core and the hub-network adapter device has the form of a printed circuit board. In three alternative embodiments, network interface circuit 210 is AM 79C970 (for PCI bus), AM 79C960/961 (for ISA or EISA bus) or AM 79C965 (for VL bus) all available from AMD.

Substrate 201 also supports a network interface circuit 210 and has a network port 211. In the embodiment of FIG. 2A, network port 211 is also a 10BASE-T port that has terminals similar to those described above in reference to repeater port 203. Specifically, network port 211 has a positive transmit terminal 212, a negative transmit terminal 213, a positive receive terminal 214, a negative receive terminal 215, a positive predistortion transmit terminal 216 and a negative predistortion transmit terminal 217.

Substrate 201 also supports electrically conductive traces 220–223 that directly connect network port 211 to repeater port 203, thereby eliminating several prior art components, such as a transceiver, or a filter, a connector and an ethernet cable. For example, a pair of Manchester encoded signals, supplied by network interface circuit 210 at transmit terminals 212 and 213, is directly conveyed by traces 220 and 221 to receive terminals 204 and 205 of repeater circuit 202.

Similarly, traces 222 and 223 directly convey the signals at transmit terminals 206 and 207 of repeater circuit 202 to the receive terminals 214 and 215 of network interface circuit 210. The predistortion transmit terminals of both circuits, such as terminals 208, 209, 216 and 217 are left unconnected, due to elimination of the need to transmit the signals over an ethernet cable.

In one specific embodiment, optional resistors 224 and 225, each having a rating of, for example, 100 ohms, are supported by substrate 201, and are connected between traces 220 and 221 and between traces 222 and 223 respectively. Optional resistors 224 and 225 ensure that the transmitted signals meet the voltage level requirements of a 10BASE_T port's input terminals.

Network interface circuit 210 includes, in addition to network port 211, an encoder-decoder circuit 226, a transmit buffer 227, a receive buffer 228 and a media access control circuit 229, that are described below.

Figure 2C:
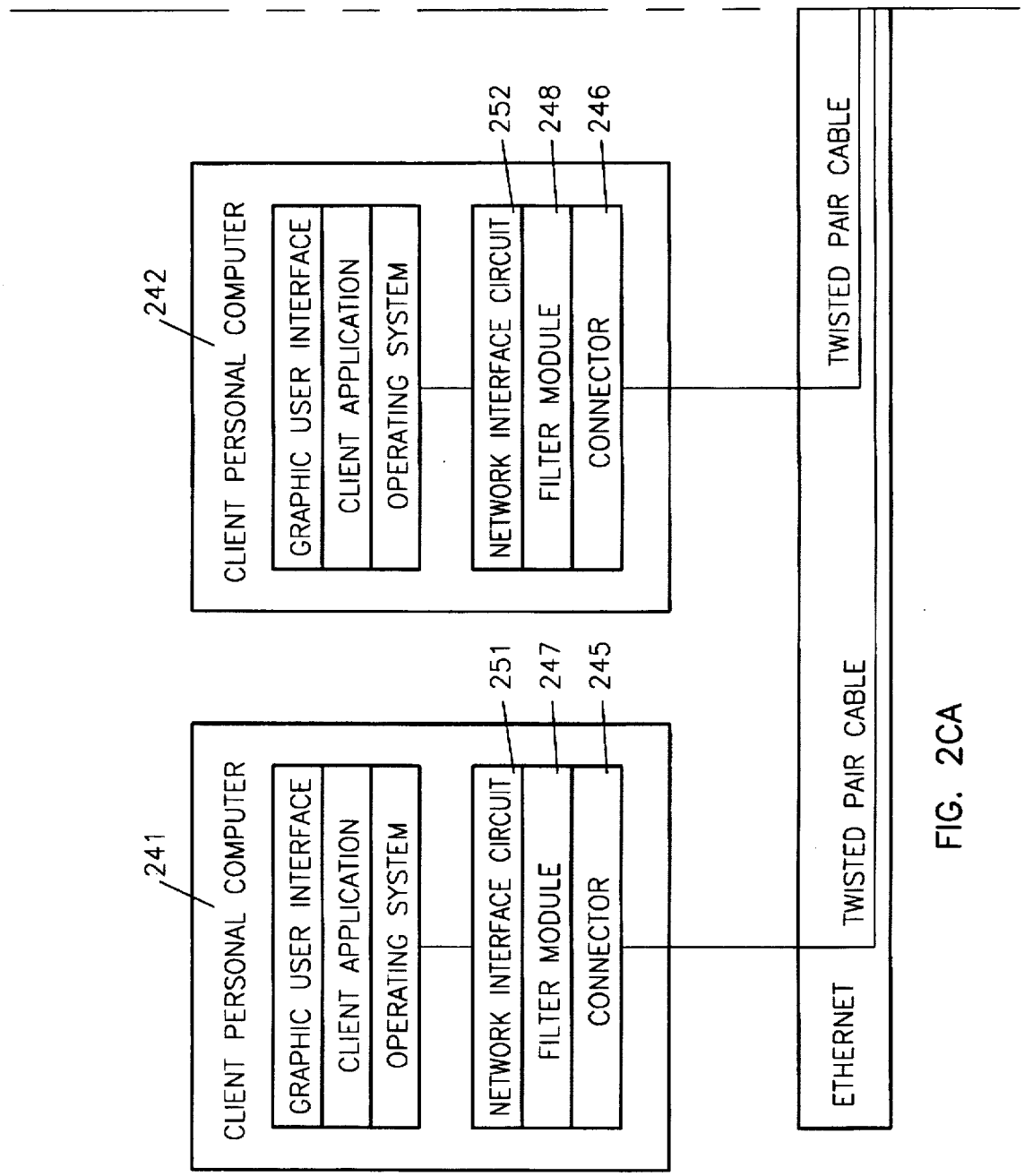
FIG. 2C (consisting of FIGS. 2CA and 2CB) illustrates a computer system that uses the hub-network adapter device of FIGS. 2A and 2B.

In addition to repeater port 203, repeater circuit 202 includes a number of repeater ports, e.g. ports 231–233 (FIG. 2B) that are indirectly coupled through conventional filters 234–236 and connectors 237–239 to network ports (not shown) in other personal computers, such as client PCs 241 and 242 (FIG. 2C). For example, repeater ports 231–233 drive signals on ethernet cables 243 and 244, that are connected by connectors 245 and 246, and filter modules 247 and 248 to network interface circuits 251 and 252 respectively, in the same manner as in the prior art.

In one embodiment, network interface circuit 210 has a number of bus terminals 261 that are coupled by an interface logic circuit 262 to a bus 263 (FIG. 2C) of a file server personal computer 264. CPU 265 of file server PC 264 transfers on bus 263 to media access control unit 229 the data to be transmitted to one of client PCs 241 or 242. Media access control unit 229 in turn formats the received data into a packet and stores the packet in a transmit buffer 227. Encoder decoder circuit 226 uses each packet stored in transmit buffer 227 to drive signals on transmit terminals 212 and 213. As noted above, the signals on transmit terminals 212 and 213 are directly conveyed by transmit traces 220 and 221 to receive terminals 204 and 205 of repeater port 203. A similar sequence of events occurs in the reverse order, during receipt of data by file server PC 264.

Figure 1A:
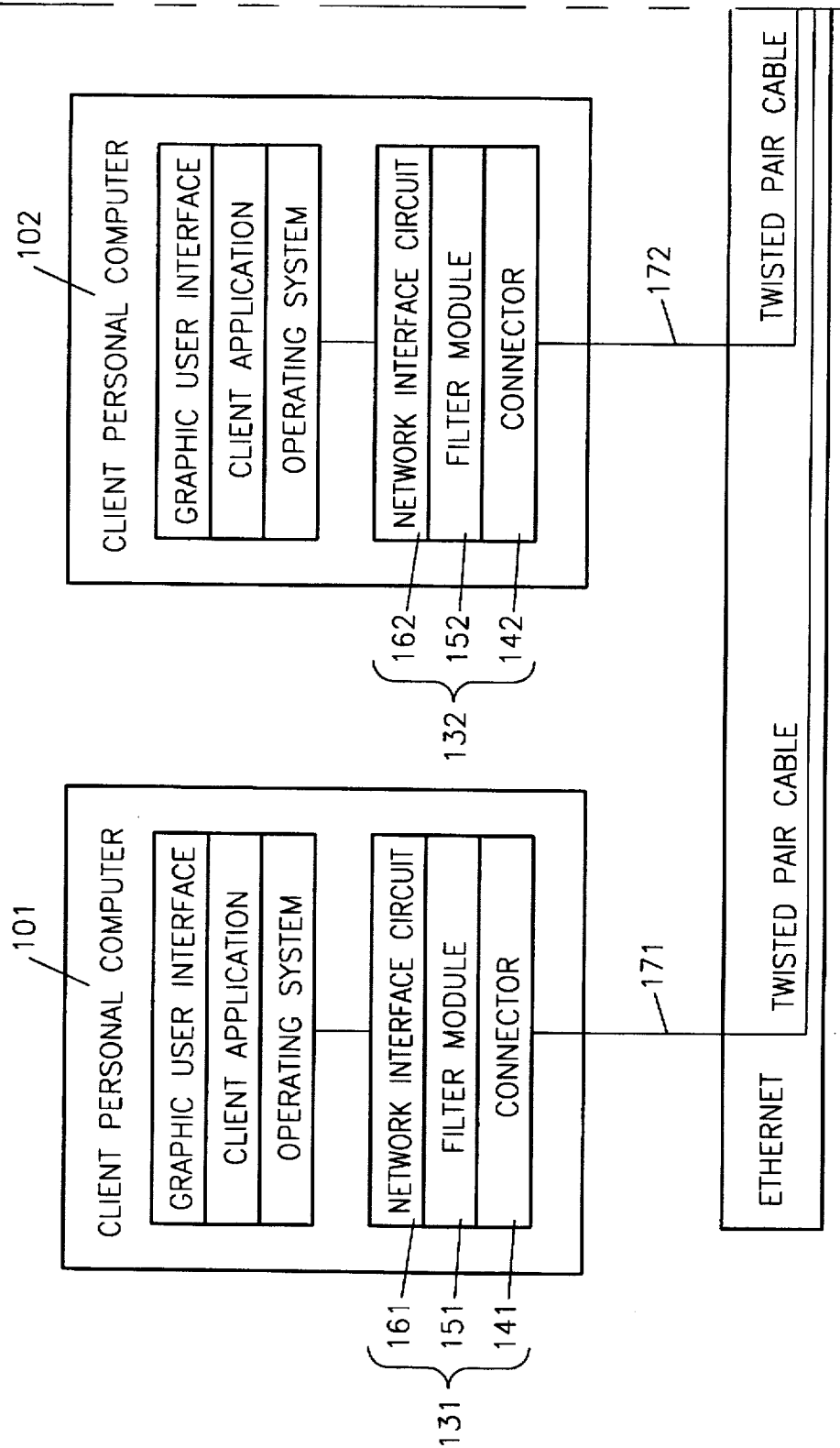
FIGS. 1B and 1C illustrate a network adapter card and a network interface circuit of the prior art.
FIGS. 1D and 1E (consisting of FIGS. 1EA and 1EB) illustrate a hub card and a repeater circuit of the prior art.
FIGS. 1F illustrates the coupling of a network interface circuit and a repeater circuit by a prior art twisted pair ethernet transceiver.
Figure 1A:
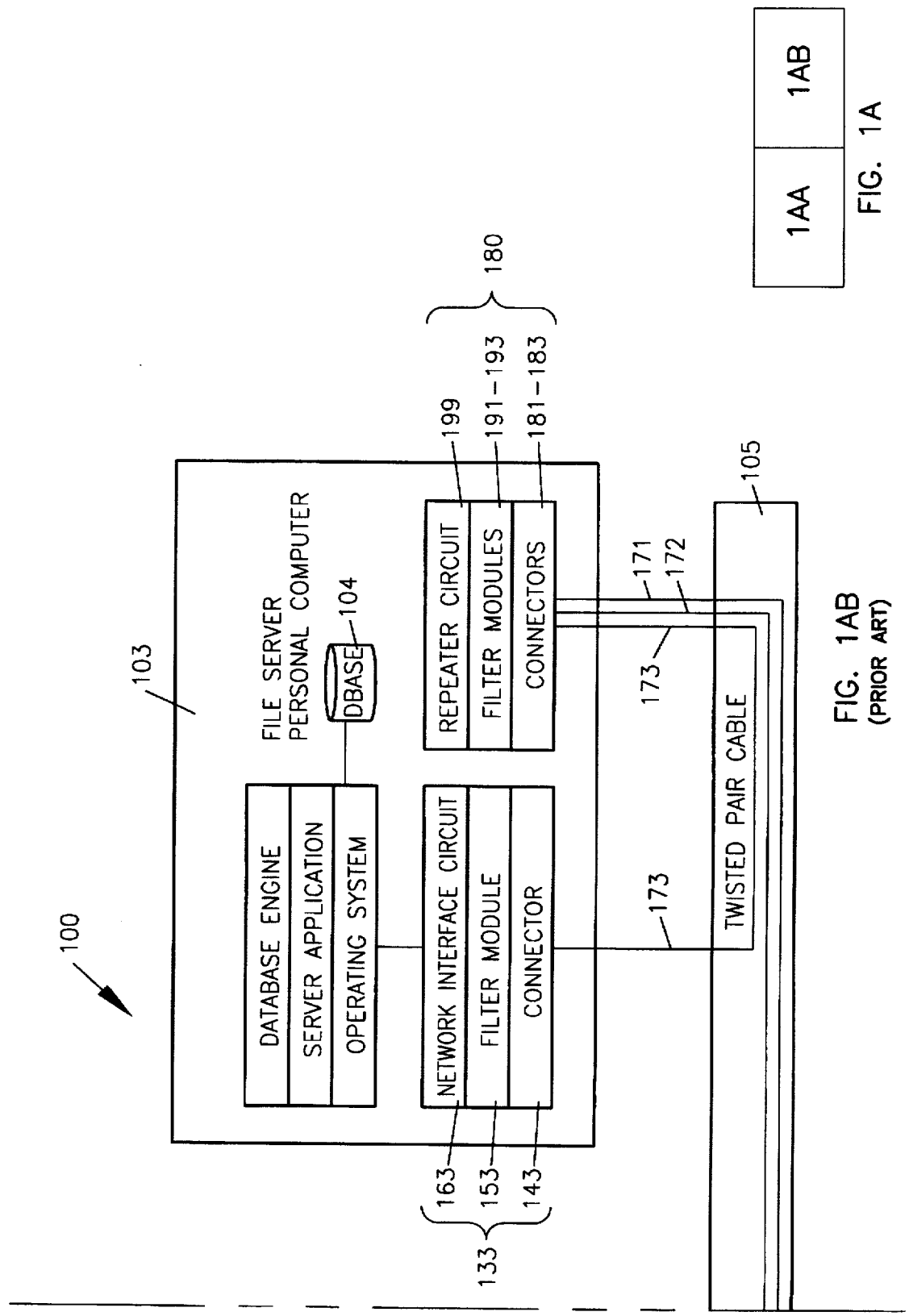
Figure 1B:
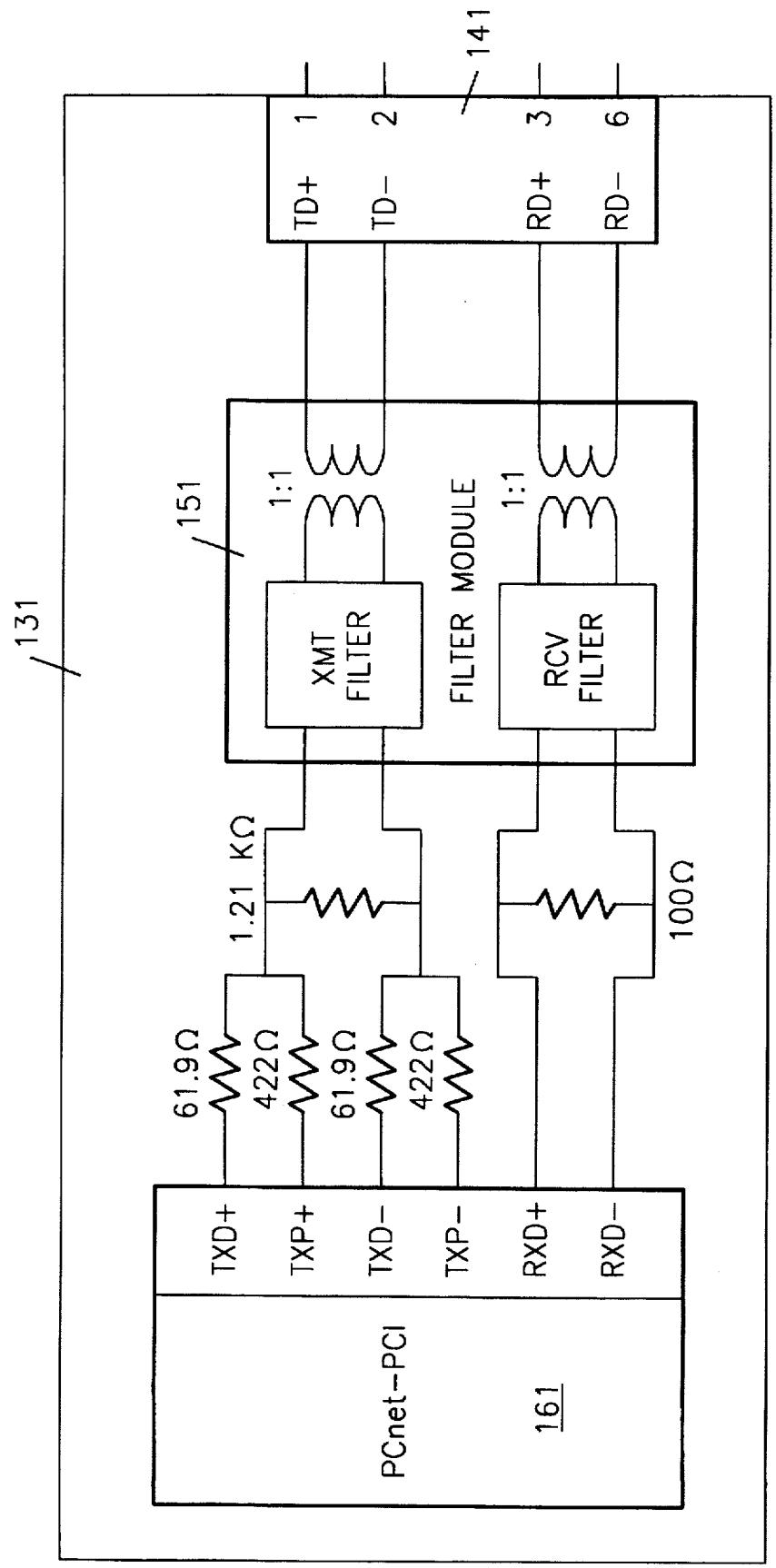
Figure 1C:
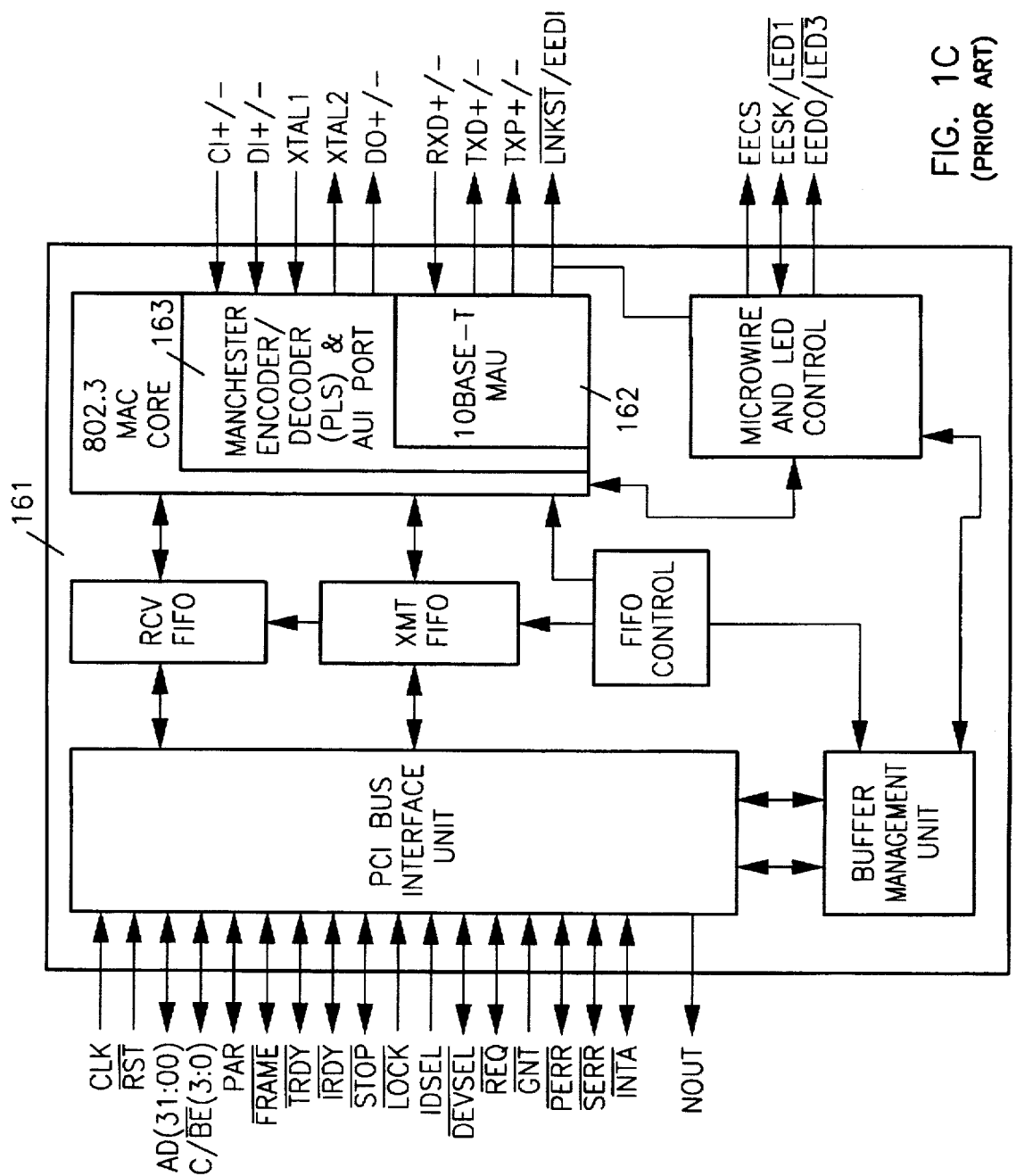
Figure 1D:
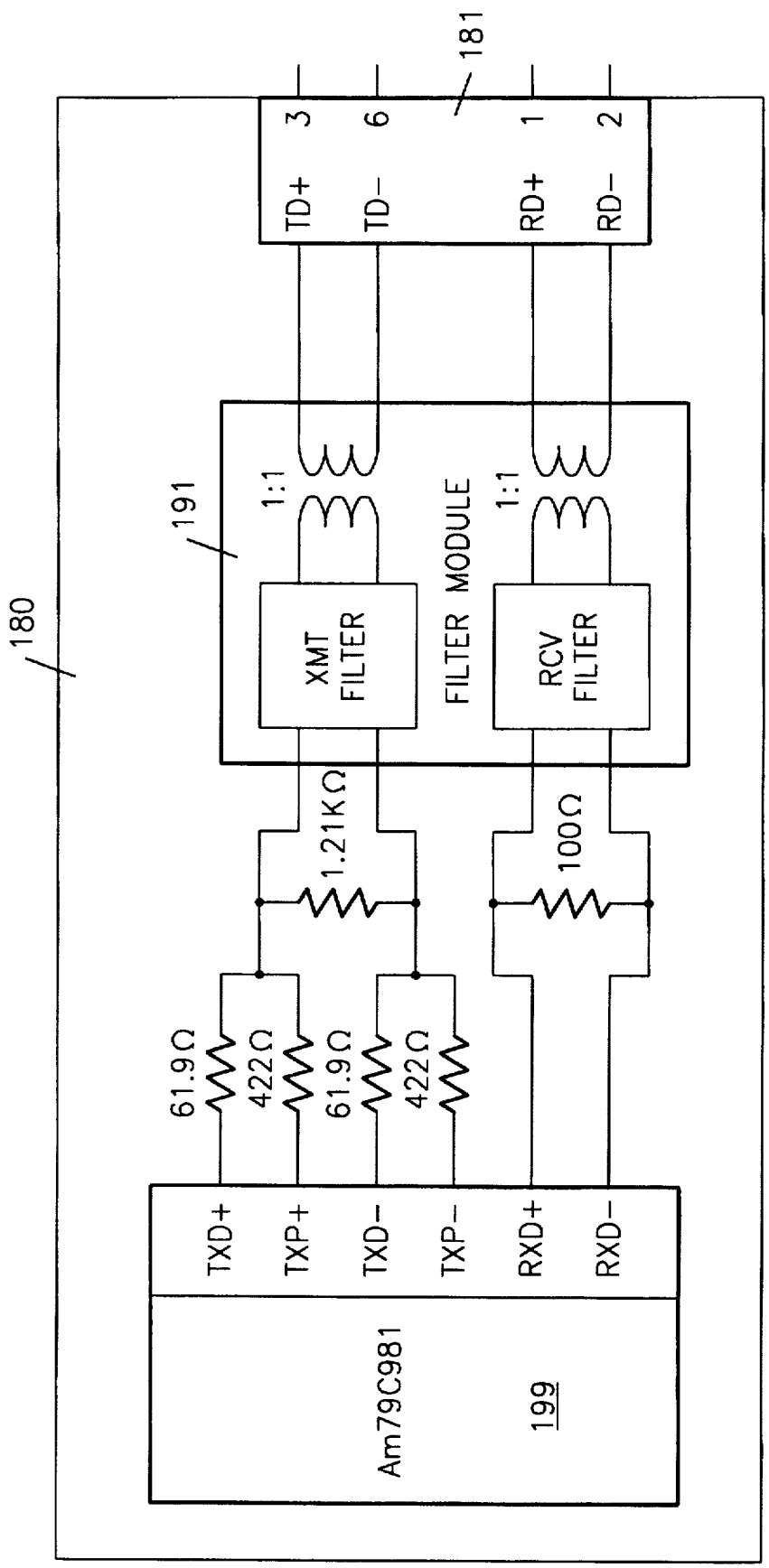
Figure 1E:
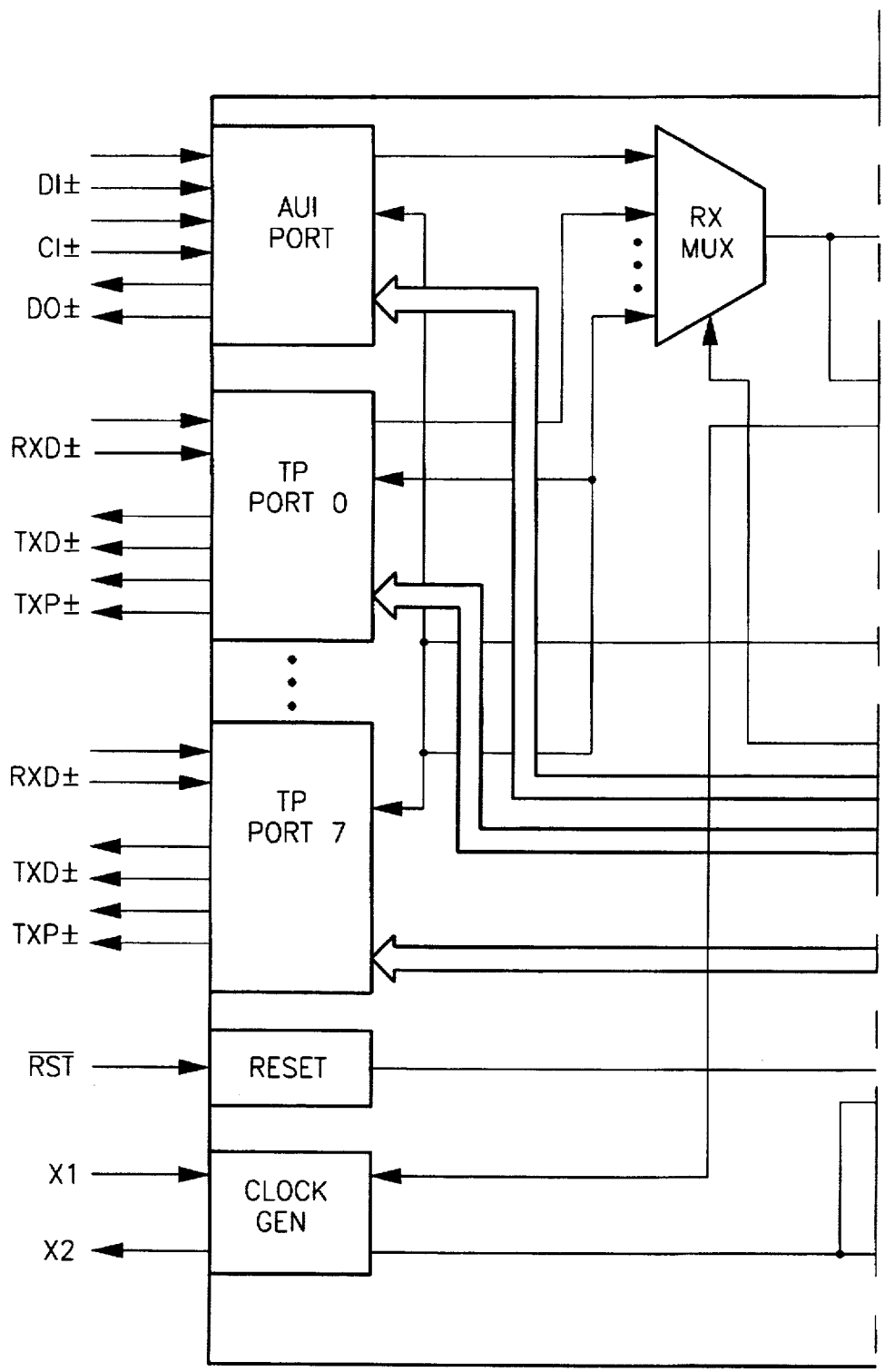
Figure 1E:
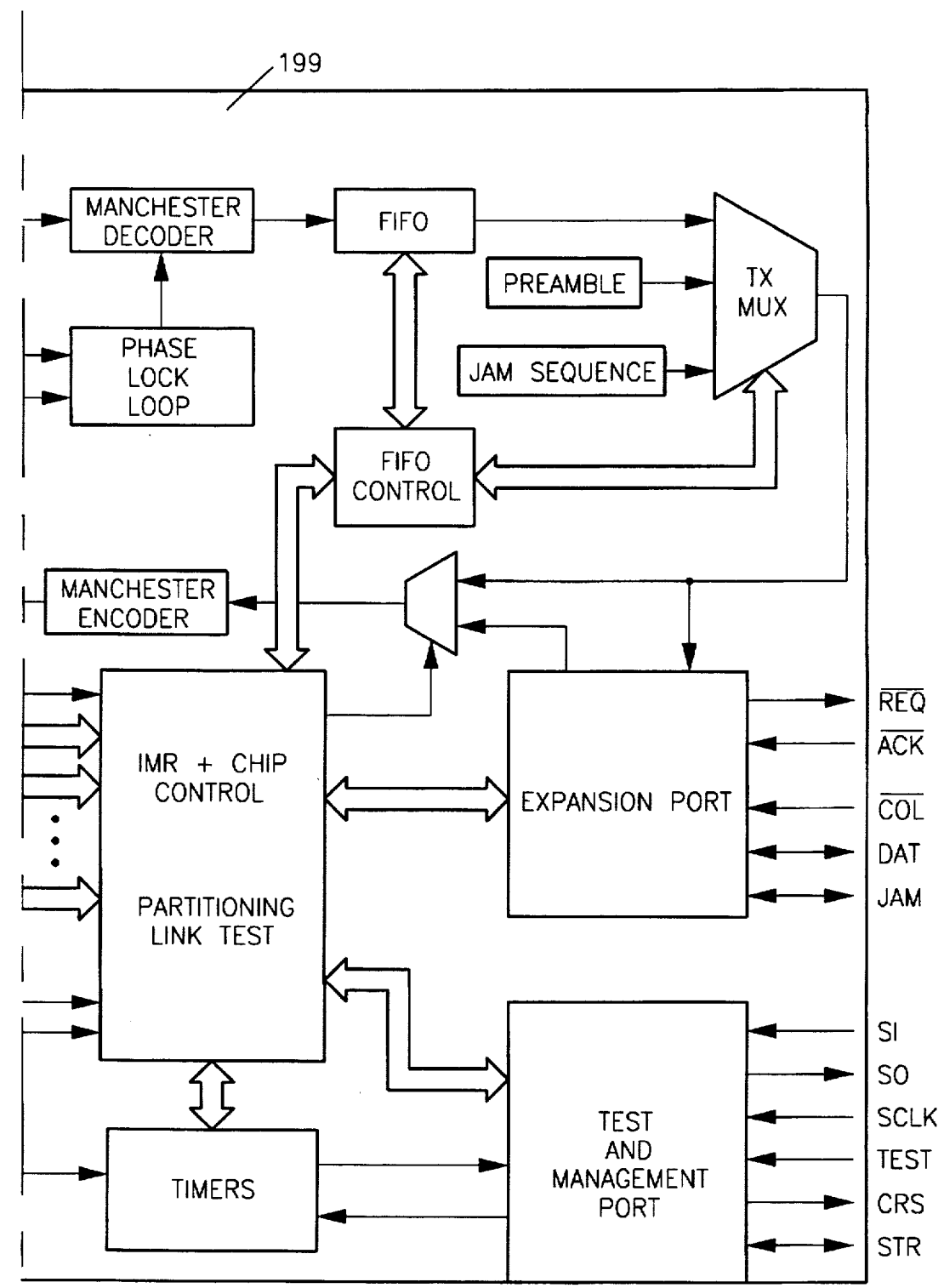
Figure 1E:
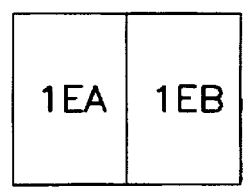
Figure 1F:
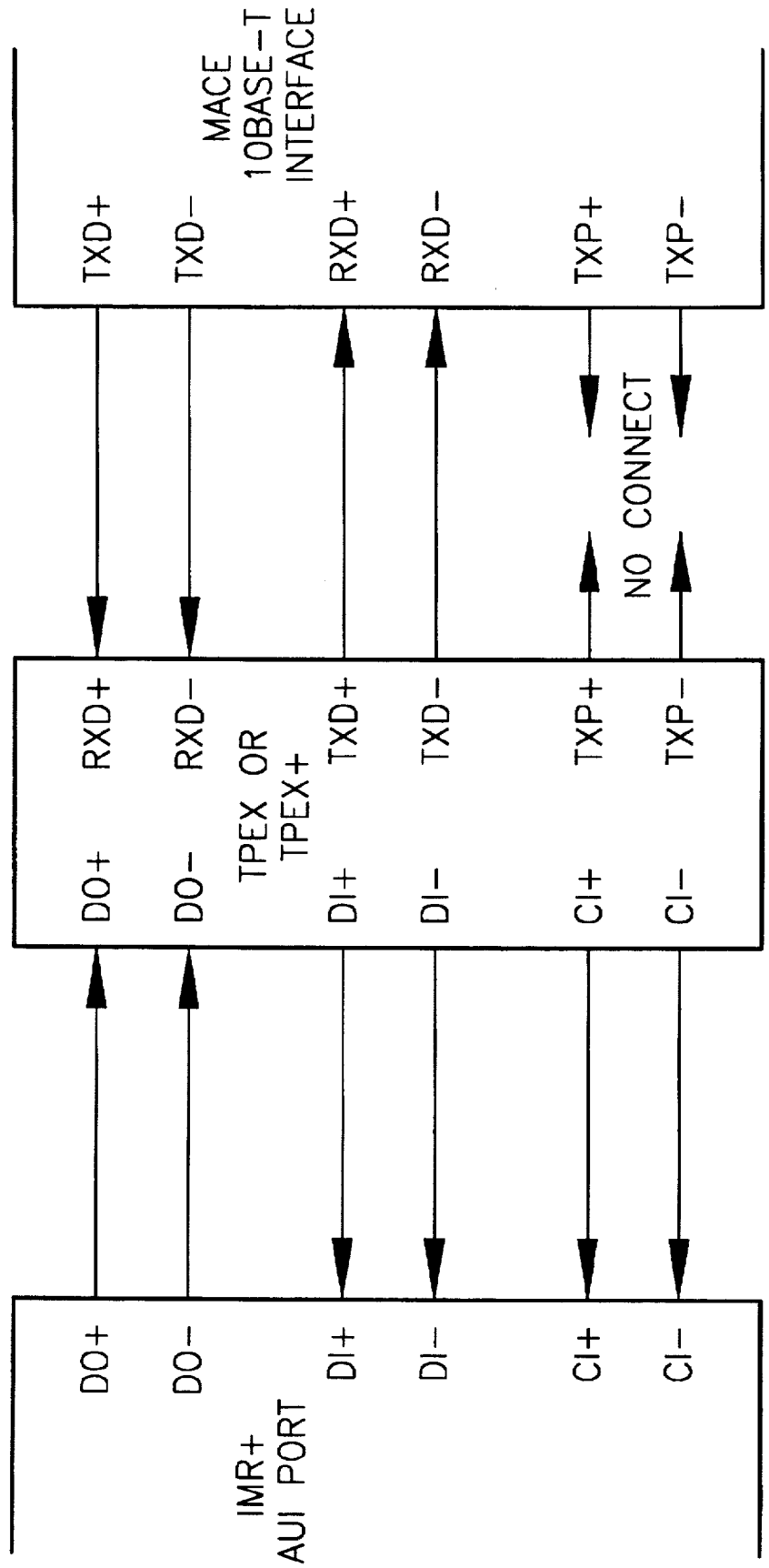

The direct connection on a single substrate between network port 211 and repeater port 203, as described above, has several advantages. The direct connection eliminates conventional parts, such as twisted pair ethernet transceiver of FIG. 1F, or filter module 153, connector 143 and ethernet cable 173. Therefore, hub-network adaptor device 200 has fewer parts, greater reliability and lower cost, as compared to a prior art device.

Numerous variations and adaptations of the invention will be obvious in view of the enclosed description. For example, although substrate 201 has been described above as printed circuit board core in one embodiment, another embodiment of hub-network adapter device 200 can be formed as a single integrated circuit, wherein repeater circuit 202, network interface circuit 210 and traces 220–223 are all formed in one or more layers of the integrated circuit.

Various modifications and adaptations of the above-described invention are encompassed by the attached claims.

I claim:

1. A hub-network adapter device for coupling a peripheral bus inside a computer to a network of other computers, the hub-network adapter device comprising:

a substrate;

a network interface circuit supported by said substrate, said network interface circuit having a network port and a plurality of bus terminals couplable to said peripheral bus, at least one bus terminal being dedicated to carrying an interrupt signal,
        wherein said network interface circuit serially transmits on said network port a packet containing data received in parallel form from multiple bus terminals;

a plurality of electrical conductors connected to said network port and supported by said substrate; and a repeater circuit supported by said substrate, said repeater circuit having a plurality of repeater ports, each repeater port being identical to every other repeater port in said plurality of repeater ports, each repeater port being couplable to one of the other computers, a first repeater port in said plurality of repeater ports being directly connected by said plurality of electrical conductors to said network port,
        wherein said repeater circuit receives said packet in serial form from said electrical conductors and transmits said packet in serial form on more than one of said repeater ports.

2. The hub-network adapter device of claim 1 formed as a printed circuit board, wherein said substrate comprises printed circuit board core, said network interface circuit is formed in a first integrated circuit mounted on said substrate, said repeater circuit is formed in a second integrated circuit mounted on said substrate and said plurality of electrical conductors are conductive traces formed within said substrate.

3. The hub-network adapter device of claim 1 wherein said network interface circuit can transmit on said bus terminals, data retrieved from a packet received at said network port.

4. The hub-network adapter device of claim 1 wherein said network interface circuit implements a carrier sense multiple access collision detect protocol during said transmission of said packet on said network port.

5. The hub-network adapter device of claim 1:
    wherein said network interface circuit comprises an encoder-decoder circuit and said encoder-decoder circuit drives at least one signal on said network port.

6. The hub-network adapter device of claim 1 wherein said network interface circuit comprises a media access control circuit, a transmit buffer and a receive buffer, wherein said media access control circuit writes into said transmit buffer a packet containing data received by said media access control circuit.

7. The hub-network adapter device of claim 6 wherein said media access control circuit reads from said receive buffer a packet received on said network port.

8. The hub-network adapter device of claim 7 wherein the packet to be transmitted is read from said transmit buffer by an encoder-decoder circuit.

9. The hub-network adapter device of claim 1 further comprising a filter module supported by said substrate, said filter module being connected to a second repeater port in said plurality of repeater ports.

10. The hub-network adapter device of claim 9 wherein said filter module encodes a packet received from the repeater port connected to said filter module, and further wherein said filter module transmits said encoded packet on a connector connected to said filter module.

11. The hub-network adapter device of claim 9 wherein said filter module decodes a packet received from a connector and transfers said decoded packet to the repeater port coupled to said filter module.

12. The hub-network adapter device of claim 1 wherein said network port and said repeater port are identical to each other.

13. The hub-network adapter device of claim 1 wherein said repeater is devoid of any ports other than said plurality of repeater ports.

14. The hub-network adapter device of claim 1 wherein said network port is a 10BASE-T port, each of said repeater ports is also a 10BASE-T port, said bus terminals are terminals of the PCI bus, each of said circuits is an integrated circuit die, and said substrate is a printed circuit board.

15. The hub-network adapter device of claim 1 wherein:
    said network port has a first positive transmit terminal, a first negative transmit terminal coupled to the first positive transmit terminal through a resistor, a first positive receive terminal, and a first negative receive terminal coupled to the first positive receive terminal through another resistor,
        said network port transmitting Manchester encoded differential signals on said first positive transmit terminal and said first negative transmit terminal during operation of said device; and
    said repeater port has a second positive transmit terminal coupled to said first positive receive terminal, a second negative transmit terminal coupled to said first negative receive terminal, a second positive receive terminal coupled to said first positive transmit terminal, a second negative receive terminal coupled to said first negative transmit terminal, a second positive receive terminal coupled to said first positive transmit terminal,
        said repeater port transmitting Manchester encoded differential signals on said second positive transmit terminal and said second negative transmit terminal during operation of said device.

16. The hub-network adapter device of claim 15 wherein:
    said network port has a first positive predistortion transmit terminal and a first negative predistortion transmit terminal, said first positive predistortion transmit terminal and said first negative predistortion transmit terminal being unconnected; and
    said repeater port has a second positive predistortion transmit terminal and a second negative predistortion transmit terminal, said second positive predistortion transmit terminal and said second negative predistortion transmit terminal being unconnected.

17. A file server personal computer for allowing access to a number of devices shared by other computers, the file server personal computer comprising:

central processing unit;

memory containing at least a portion of a database engine and at least a portion of a server application;

a bus coupled to said central processing unit and to said memory; and an hub-network adapter device coupled to said central processing unit by said bus, said hub-network adapter device comprising a substrate, a network interface circuit supported by said substrate and a repeater circuit supported by said substrate, said network interface circuit having a network port and a plurality of bus terminals, the plurality of bus terminals being coupled to said bus, said repeater circuit having a plurality of repeater ports, each repeater port being identical to every other repeater port in said plurality of repeater ports, a first repeater port in said plurality of repeater ports being coupled to said network port;

wherein said network interface circuit transmits via said network port to said first repeater port, a packet containing data received on said bus, and said repeater circuit transmits said packet on more than one of said repeater ports in response to receipt of said packet on said first repeater port; and wherein said hub-network adapter device transmits data received from said database engine, subsequent to receipt of a packet requesting said data at one of said repeater ports.

18. The file server personal computer of claim 17 wherein said bus is compatible with ISA bus and is directly connected to said plurality of bus terminals.

19. The file server personal computer of claim 17 wherein said bus is compatible with VL bus and is directly connected to said plurality of bus terminals.

20. The file server personal computer of claim 17 wherein said bus is compatible with PCI bus and is directly connected to said plurality of bus terminals.

21. A computer system comprising:

the filer server personal computer of claim 17;

a plurality of twisted-pair cables; and a plurality of client personal computers coupled to said file server personal computer by at least one twisted pair cable, each client personal computer comprising a network port, said network port being coupled to a repeater port in said file server personal computer;

wherein each client personal computer transmits said requesting packet to the network port of said file server personal computer via said repeater port while accessing said shared devices.

22. A hub-network adapter device for coupling a bus inside a computer to a network of other computers, the hub-network adapter device comprising:

a substrate;

a network interface circuit supported by said substrate, said network interface circuit having a network port and a plurality of bus terminals, at least one bus terminal being dedicated to carrying an interrupt signal;

a plurality of electrical conductors coupled to said network port and supported by said substrate; and a repeater circuit supported by said substrate, said repeater circuit comprising a plurality of identical repeater ports, each repeater port being couplable to one of said other computers by said network, a first repeater port in said plurality of repeater ports being coupled by said plurality of electrical conductors to said network port;

wherein said plurality of electrical conductors convey a packet in serial form from said network port to said first repeater port and said repeater circuit transmits said packet in serial form on each of said repeater ports in response to receipt of said packet on said first repeater port.

23. The hub-network adapter device of claim 22, wherein said network port and said first repeater port are identical to each other.

24. The hub-network adapter device of claim 22 further comprising a filter module supported by said substrate, said filter module being coupled to a second repeater port, said device being devoid of a filter module in an electrical path between said first repeater port and said network port.

25. The hub-network adapter device of claim 22 wherein said bus is compatible with PCI bus.

* * * * *